(12) United States Patent
Piechowski et al.

(10) Patent No.: US 12,227,308 B2
(45) Date of Patent: Feb. 18, 2025

(54) VAPOR PROPELLANT MANAGEMENT SYSTEM

(71) Applicant: The Aerospace Corporation, El Segundo, CA (US)

(72) Inventors: Madison Piechowski, Huntington Beach, CA (US); Brandie L Rhodes, Friendswood, TX (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 364 days.

(21) Appl. No.: 17/851,599

(22) Filed: Jun. 28, 2022

(65) Prior Publication Data

US 2023/0415922 A1    Dec. 28, 2023

(51) Int. Cl.
*B64G 1/00* (2006.01)
(52) U.S. Cl.
CPC ..................... *B64G 1/00* (2013.01)
(58) Field of Classification Search
CPC ......................................................... B64G 1/00
See application file for complete search history.

(56) References Cited

FOREIGN PATENT DOCUMENTS

CN    204469285 U  *  7/2015

OTHER PUBLICATIONS

Rhodes, et al., "Dynamics of a Small-Scale Hydrogen Peroxide Vapor Propulsion System", Journal of Propulsion and Power, vol. 35, No. 3 , May-Jun. 2019.
Rhodes, et al., "Hydrogen Peroxide Vapor Cross Sections: A Flow Cell Study Using Laser Adsorption in the Near Infrared", Chemical Physics Letters 692 (2018) 359-363.
Rhodes, et al., "HyPer—a Green Monopropellant for Small Satellite Propulsion", 35th Annual Small Satellite Conference, Utah State University, Logan, UT, Jul. 9, 2021.
Rhodes, et al., "Reaction of Hydrogen Peroxide Vapor on Platinum on Alumina Spheres", Applied Catalysis A, General 608 (2020) 117824.
Rhodes, et al., "Small-Scale Hydrogen Peroxide Vapor Propulsion System: Catalyst Performance and Heat Transfer", AIAA Propulsion and Energy Forum, Aug. 19-22, 2019, Indianapolis, IN, AIAA Propulsion and Energy 2019 Forum.
Rhodes, et al., "Thrust Measurement of a Hydrogen Peroxide Vapor Propulsion System", AIAA Propulsion and Energy Forum, Aug. 24-28, 2020, Virtual Event, AIAA Propulsion and Energy 2020 Forum.

* cited by examiner

*Primary Examiner* — Justin M Benedik
(74) *Attorney, Agent, or Firm* — LeonardPatel PC (57) ABSTRACT

A propellant management device (PMD) may reduce or prevent liquid propellant from entering a thruster manifold (TM) or gas venting manifold (GVM) while allowing propellant vapor and/or gas to pass through the PMD to allow for thrust or venting.

18 Claims, 11 Drawing Sheets

VAPOR PROPELLANT MANAGEMENT SYSTEM

FIELD

The present invention relates to satellite propulsion, and more particularly, to a propellant management device.

BACKGROUND

Figure 1:
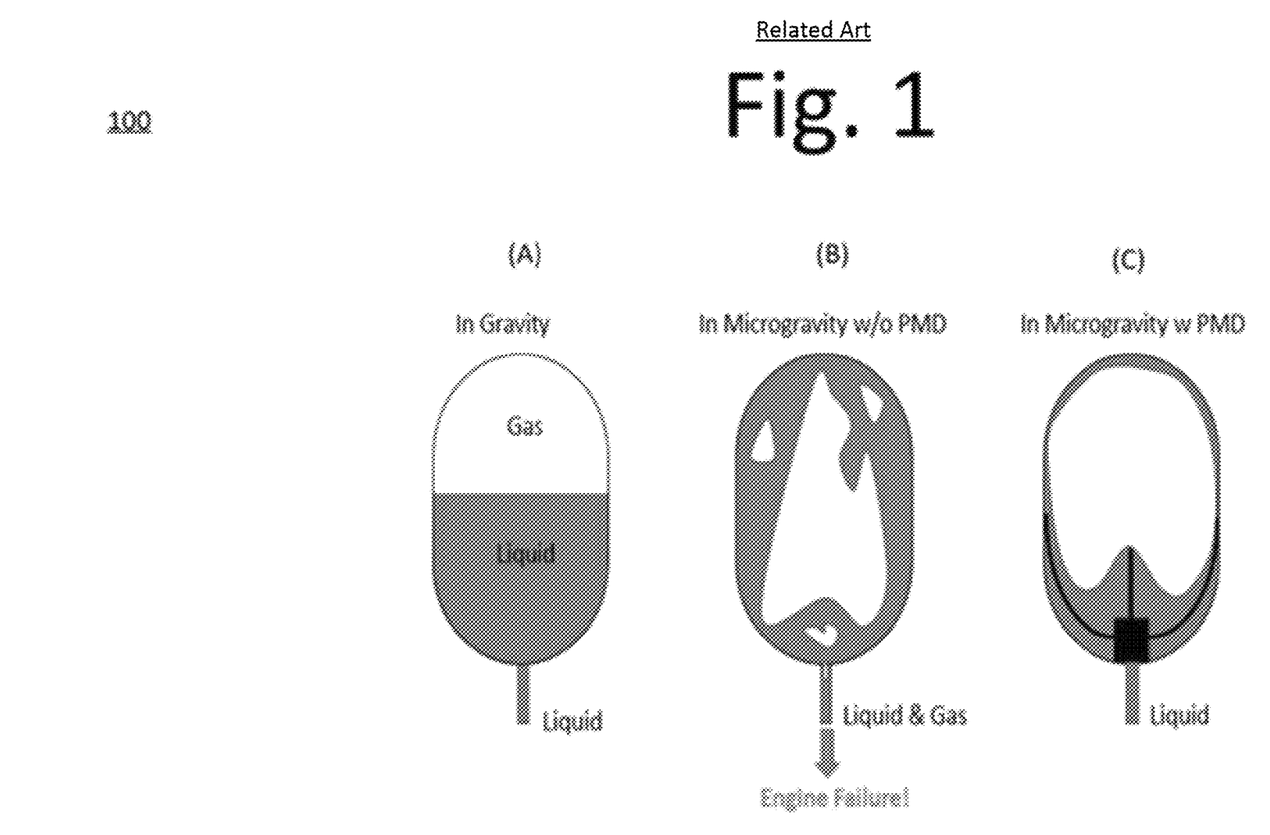
FIG. 1 is related art illustrating a conventional propulsion management device.

In satellite propulsion systems, the propulsion management device traditionally uses surface tension (e.g., vanes, sponges on the bottom of a tank) to facilitate the delivery of liquid propellant to the propulsion manifold and thrusters. During launch, the liquid propellant is isolated from the thrusters via valves. See, for example, FIG. 1, which is related art illustrating a conventional propulsion management device 100. In FIG. 1, (A) shows liquid in a tank in a gravity environment, where gravity forces the liquid to the bottom of the tank, and therefore, flow from the exit port is purely liquid. (B), on the other hand, shows the same tank in a microgravity environment, where without the assistance of gravity, the flow out of the tank will be a mixture of liquid and gas. Most propulsion systems are not equipped to handle a mixture of liquid propellant and gas and this can lead to engine failure. (C) shows the tank in a microgravity environment with a propellant management device (PMD). While this illustration shows veins and a sump that draws liquid to the bottom port, other versions of liquid PMDs exist, and all are intended to deliver liquid, not gas or vapor, to the exit port.

These PMDs are designed to facilitate the flow of liquid into the propulsion manifold and to prevent vapor or gas from entering the manifold. The thrusters in these systems are designed to run on liquid and gas ingestion can result in catastrophic failure.

For thrusters designed to run on the vapor phase of the propellant, a propellant management device designed to deliver liquid and prevent gas/vapor delivery is completely ineffective.

Accordingly, the invention of a new propellant management device designed for a vapor-fed propulsion system is necessary.

SUMMARY

Certain embodiments of the present invention may provide solutions to the problems and needs in the art that have not yet been fully identified, appreciated, or solved by current propellant management device technologies. For example, some embodiments of the present invention pertain to a propellant management device configured to prevent liquid propellant from entering the thruster or venting manifolds while allowing propellant vapor to pass through to produce thrust and gas products of decomposing propellant or excess propellant vapor or gas to vents via vent relief valves (VRVs).

In an embodiment, a propellant management system includes a PMD configured to reduce or prevent liquid propellant from entering a thruster manifold (TM) or gas venting manifold (GVM) while allowing propellant vapor and/or gas to pass through the PMD to allow for thrust or venting.

In another embodiment, a propellant management system includes a PMD placed inside of a tank. The PMD is configured to reduce or prevent liquid propellant from entering a TM or GVM while allowing propellant vapor and/or gas to pass through the PMD to allow for thrust or venting. The propellant management system includes a shaft connecting the PMD to a TM and a GVM. The shaft allows the propellant vapor and/or gas to pass through to the TM or GVM.

In yet another embodiment, a propellant management system includes a PMD configured to reduce or prevent liquid propellant from entering a TM or GVM while allowing propellant vapor and/or gas to pass through the PMD to allow for thrust or venting. The PMD includes a junction on the inside of a tank, with the junction being constructed with hydrophobic material. The hydrophobic material configured to create low interfacial tension between the junction and the liquid propellent, repelling the liquid propellant from a surface of the junction.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention pertain to a propellant management system. The propellant management system includes a PMD configured to prevent liquid propellant from entering the thruster or venting manifolds while allowing (1) propellant vapor or gas to pass through to produce thrust and (2) gas product of decomposing propellants (e.g., oxygen for a hydrogen peroxide propellant) or undesired excess propellant vapor (e.g. nitrous dioxide vapor for a nitrogen dioxide propellant) to vents via VRVs. In an embodiment, the PMD may be inside of a tank and may include a junction constructed with hydrophobic material (e.g. Teflon) on the inside of the tank. The hydrophobic material results in low interfacial tension between the junction and the liquid, effectively repelling the liquid from the surface. Interfacial (surface) tension may be defined as adhesive forces (tension) between the liquid phase of one substance and either a solid, liquid, or gas phase of another substance. Hydrophobic behavior is observed by surfaces with critical surface tensions less than 35 dynes per centimeter. An example of this is how PTFE has a critical surface tension of 18.5 dynes per centimeter, making it hydrophobic in nature. The PMD uses the junction to connect entry ports of the GVM and TM. The junction in some embodiments contains small holes of a predefined diameter designed to additionally limit liquid transfer by taking advantage of the liquids' cohesive properties. Necessary hole diameter to limit liquid passage may depend on several parameters including but not limited to molecular properties, surface material, and pressure. The combination of the hydrophobic material and the controlled hole size results in the inability of liquid to enter the junction and therefore the propellant manifold. Severe environments could be critical factors in the design of the junction. These environments include, but are not limited to impact, vibration, and thermal.

In certain embodiments, the junction is placed in the center of the tank. When the tank is filled half full of liquid, whether in a gravity or microgravity environment, some of the holes are exposed to the gas and/or vapor phase, no matter the tank orientation. In gravity, the liquid is forced in the downward direction, leaving half of the holes exposed. In microgravity, the liquid will be drawn to the side of the tank and away from the hydrophobic junction, limiting the liquid interaction with the holes.

The liquid propellant passage through the PMD, at any temperature and pressure, would be nonexistent or negligible, which would be the only pathway to the manifolds. Instead, only propellant vapor or gas decomposition byproducts moves through the holes, keeping the manifolds safe from the liquid propellant. The junction holes lead to a central flow shaft that allows the gas/vapor to access the manifolds.

In some embodiments, a GVM fed from the junction may prevent over-pressurization. An over-pressurization event occurs when the pressure inside of the tank passes the maximum allowable system pressure causing a leak or structural failure. This can be catastrophic for the propulsion system and the satellite. The GVM may facilitate the flow of vapor and/or gas from the junction and central flow shaft within the tank out of the VRVs when the designated pressure is reached, all while keeping liquid inside of the tank. Due to the configuration of the junction and central flow shaft, the manifolds may always be at tank pressure. Therefore, if the designated pressure is reached, the VRVs within the GVM open allowing excess pressure to be released. When pressure is again below the designated pressure, the valve closes. This may be done with a purely mechanical VRV or with an actuated VRV.

In some embodiments, the propellant flow or TM may facilitate the flow of vapor and/or gas through the nozzle when valves are opened, all while keeping liquid inside of the tank. The vapor and/or gas flow may produce thrust. The propellant vapor may react on a reacting surface to create hot product gases that could then be used for higher efficiency thrust.

In some embodiments, the PMD may be made of multiple parts to allow for easier construction.

Put simply, some embodiments include a system that includes a PMD, a GVM, and a TM for thrust.

Figure 2:
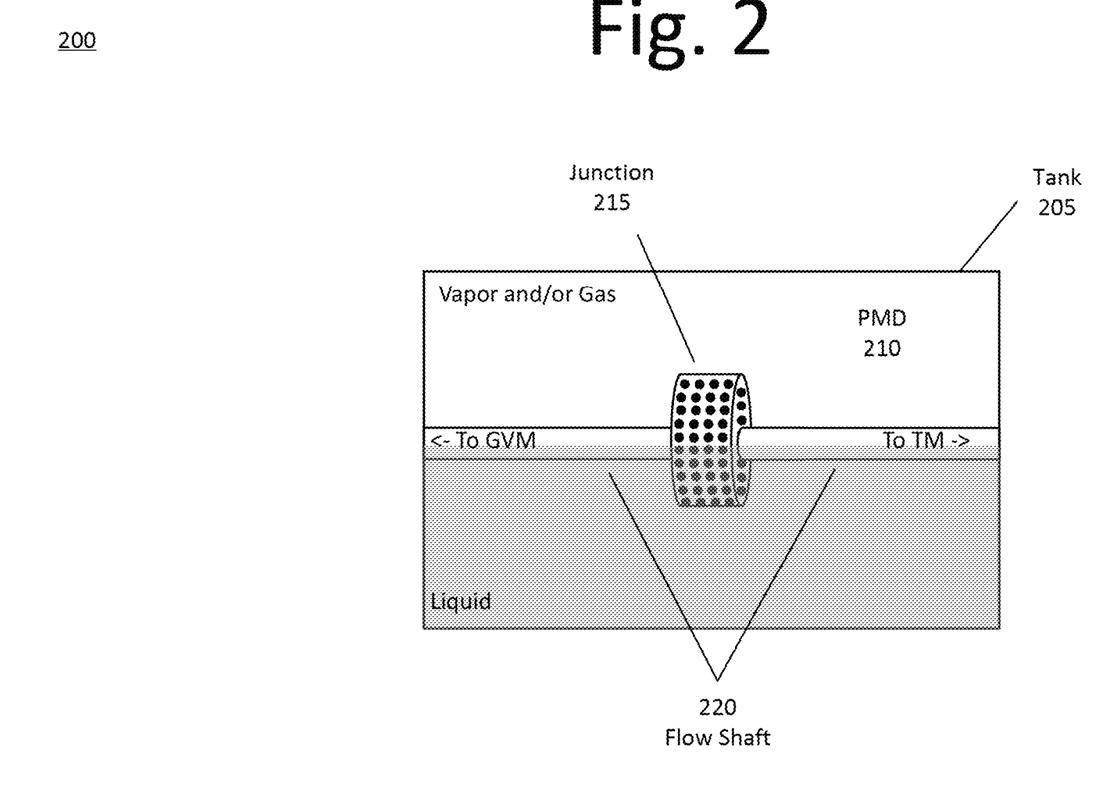
FIG. 2 is a diagram illustrating a cross-section view of a tank containing PMD, according to an embodiment of the present invention.

FIG. 2 is a diagram illustrating a cross-section view of a tank 205 containing PMD 210. In this diagram, a 50 percent liquid fill fraction in a gravity environment is shown. Arrows show the path gas and/or vapor can travel, i.e., either to the GVM or the TM, by way of flow shaft 220. Even when the holes on junction 215 are exposed to liquid, as shown in the illustration, the liquid stays in tank 205 and does not traverse the holes due to surface tension and the lack of pressure differential between tank 205 and manifolds. Surface tension may be defined as the property of the surface of a liquid that allows it to resist an external force, due to the cohesive nature of the molecule. The gas in junction 215 and in tank 205 are at the same pressure, and therefore, there is no pressure differential, negligible pressure differential, or negligible pressure force exerted on the liquid.

The pressure in tank 205 and PMD 210 remains the same at all times. If pressure venting is necessary, VRVs in the GVM open and the pressure in PMD 210 and tank 205 is released. Some liquid propellants may slowly decompose and create product gases (e.g. hydrogen peroxide) and/or have substantial vapor phase pressure (e.g. nitrogen dioxide) that could result in higher pressure in tank 205 than desired over time. That pressure, in some instances, should be relieved to prevent component or system failure.

If thrust is desired, valves in the TM open and the gas and/or vapor is flowed to the thruster for either reactive or non-reactive thrust. Thrust may be used for satellite station-keeping, orbit transfers, reaction control, or other maneuvers.

Figure 3:
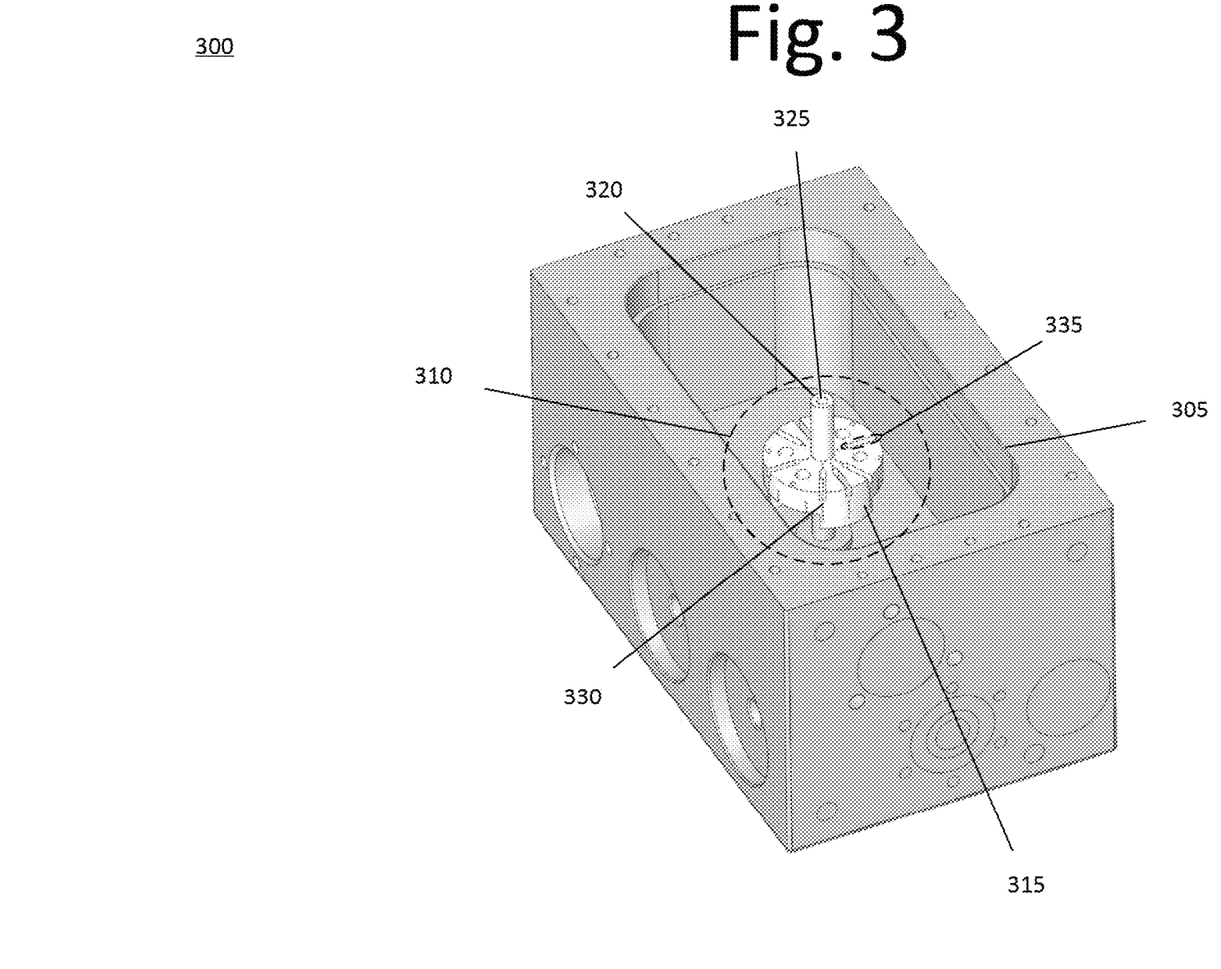
FIG. 3 is a diagram illustrating a perspective view of a tank and a propellant management system, according to an embodiment of the present invention.

FIG. 3 is a diagram illustrating a perspective view of a tank 305 and a propellant management system 300, according to an embodiment of the present invention. In some embodiments, propellant management system 300 include a tank 305. Tank 305 includes a PMD 310, which includes junction 315 and flow shaft 320. PMD 310 ensures that propellant (e.g., hydrogen peroxide) vapor travels into the TM (not shown) and GVM (not shown) while preventing the liquid propellant from passing through. In this embodiment, junction 315 features holes 330, being 0.01" in diameter distributed on the sides, top, and bottom (not shown). All of holes 330 lead to a central tube 325, so the gas and/or vapor can travel down the shaft 320 to either the TM or the GVM. Although the number and the size of holes 330 vary, often times it may be beneficial to balance total flow path and associated pressure drop and machining difficulty and associated cost. In this embodiment, PMD 310 is constructed of Teflon and is made of two parts for easier machining. The two parts press fit and seal together. The two ends of the shaft press fit and seal to either side of the interior of the tank, allowing gas passage into the manifolds.

In some embodiments, TM may be in the downward direction and the GVM may be in the upward direction. Cut-outs 335 in cylindrical junction 315 are not required, but do not hinder the embodiments and are a product of a specific application. For example, this embodiment is used for a high concentration hydrogen peroxide vapor propulsion system. The configuration allows for excess pressure from hydrogen peroxide decomposition to be safely vented through the GVM automatically and without the need for human intervention. This keeps the system within designed pressure limits. It also allows for propellant vapor and gas to travel through the TM to a catalyst and nozzle, allowing for higher efficiency thrust, when satellite maneuvering is desired.

Figure 4:
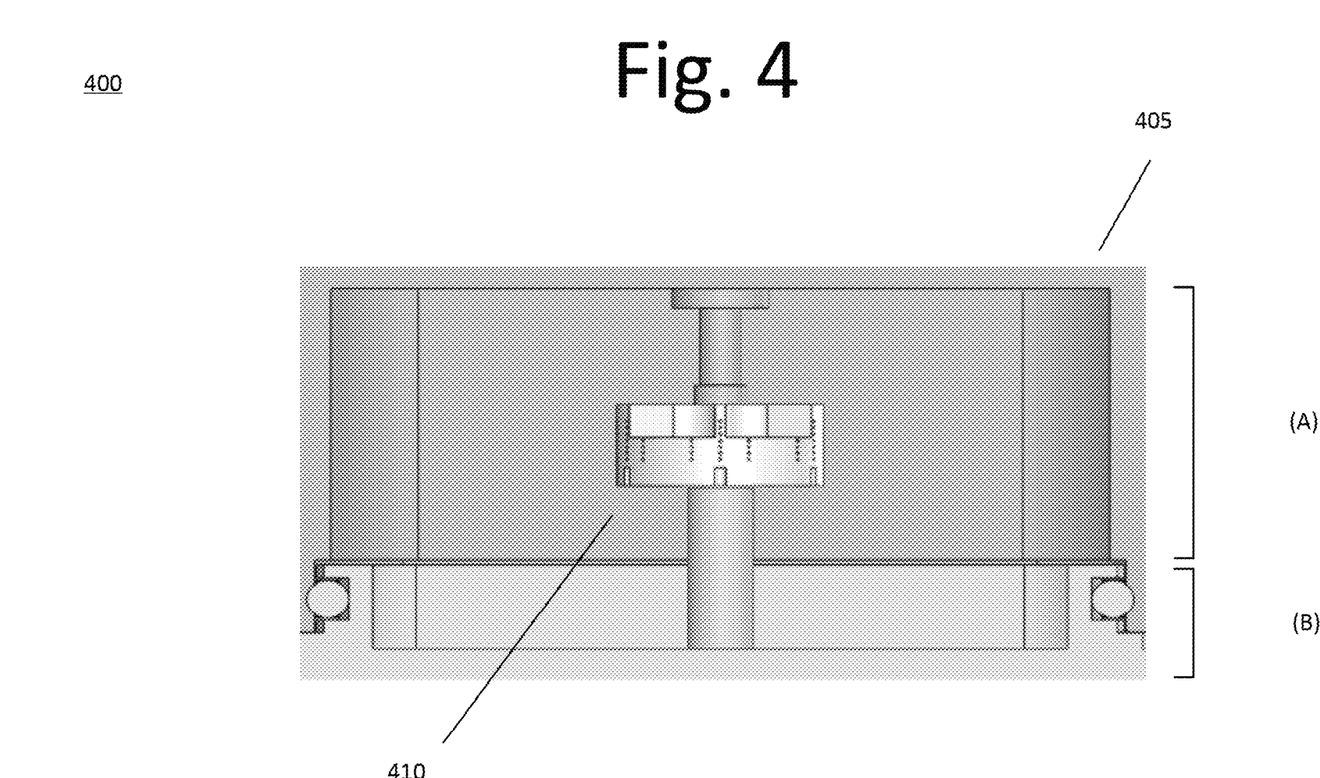
FIG. 4 is a diagram illustrating a cross-section of tank with PMD press fit inside, according to an embodiment of the present invention.

FIG. 4 is a diagram 400 illustrating a cross-section of tank 405 with PMD 410 press fit inside, according to an embodiment of the present invention. In this embodiment, PMD 410 is press fit into tank 405, such that there is a seal for the 2 parts of the PMD and at the top (A) and bottom (B) of tank 405. In this embodiment, top (A) of tank 405 leads to the TM, and the bottom (B) of tank 405 to the GVM.

Figure 5:
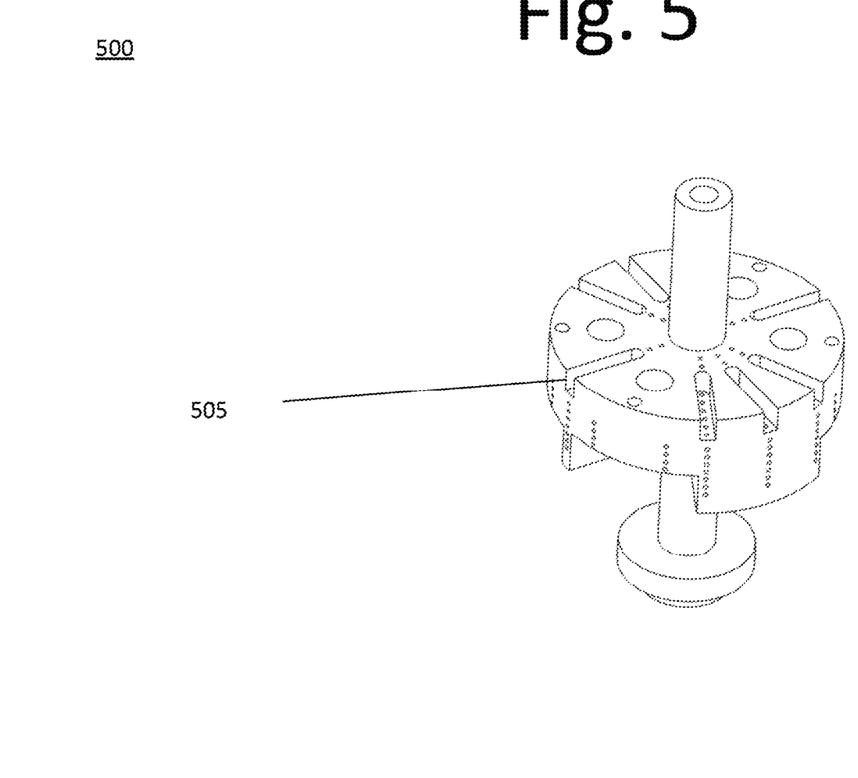
FIG. 5 is a diagram illustrating a perspective view of a PMD, according to an embodiment of the present invention.

FIG. 5 is a diagram illustrating a perspective view of a PMD 500, according to an embodiment of the present invention. In this embodiment, PMD 500 includes cut-outs 505. It should be noted that cut-outs 505 in cylindrical junction are not necessary, but do not hinder, the embodiments and are a product of a specific application. For example, this embodiment may be used for a propulsion system that is filled half-full of propellant and uses the junction in the center of the tank. The cut-outs allow for the insertion of additional propellant management features, such as veins, as well as additional structural elements such as screws.

Figure 6:
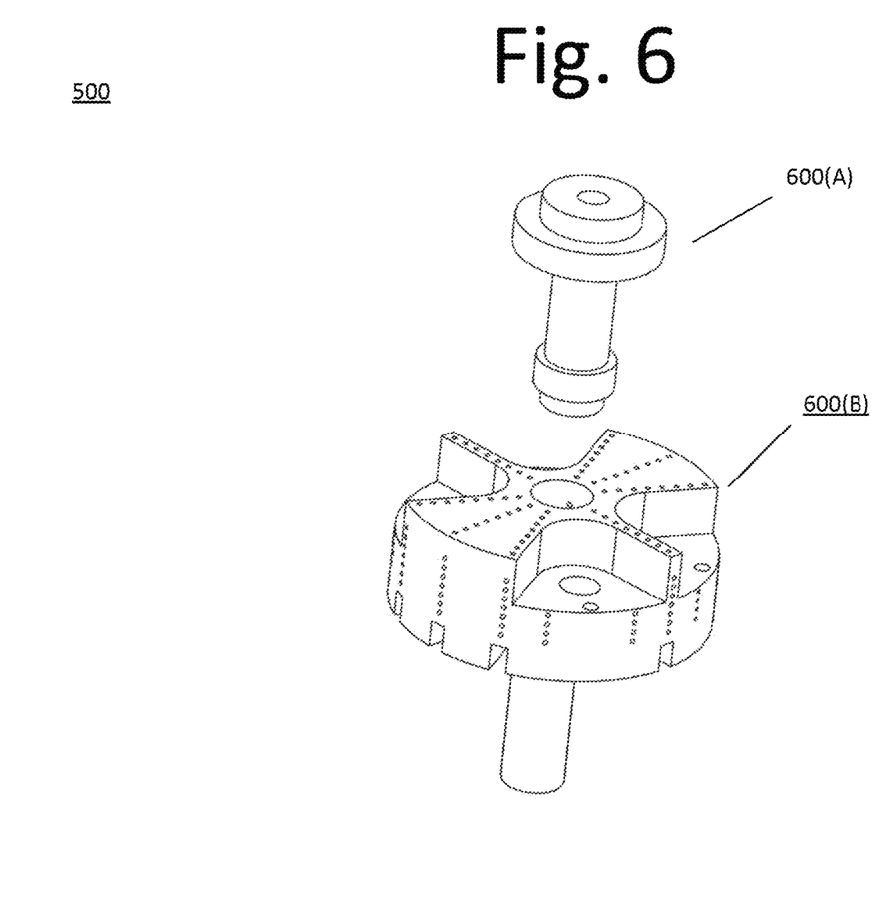
FIG. 6 is a diagram illustrating PMD of FIG. 5, according to an embodiment of the present invention.

FIG. 6 is a diagram illustrating PMD 500 of FIG. 5, according to an embodiment of the present invention. For example, PMD 500 can be constructed of 2 parts, which allows for easier machining. These two parts include top 600(a) and bottom 600(b). When top 600(a) and bottom 600(b) are pressed together, the tight fit prevents leakage and creates a full, complete PMD 500.

Figure 7:
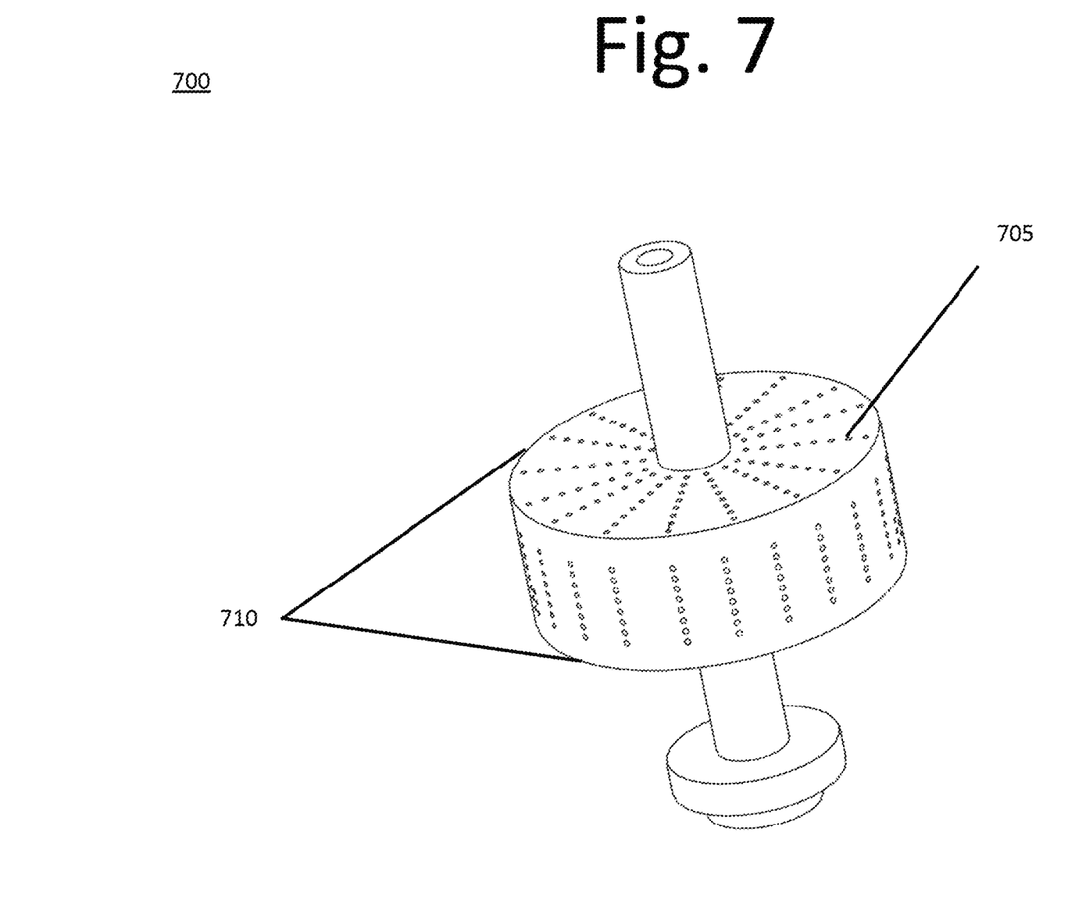
FIG. 7 is a diagram illustrating a prospective view of a PMD without cutouts, according to an embodiment of the present invention.

FIG. 7 is a diagram illustrating a prospective view of a PMD 700 without cutouts, according to an embodiment of the present invention. It should be noted that the number of holes 705 and the diameter of hole 705 may depend on the configuration of the satellite propulsion system. The shape of junction 710 and distribution of holes 705 will vary based on application.

Figure 8:
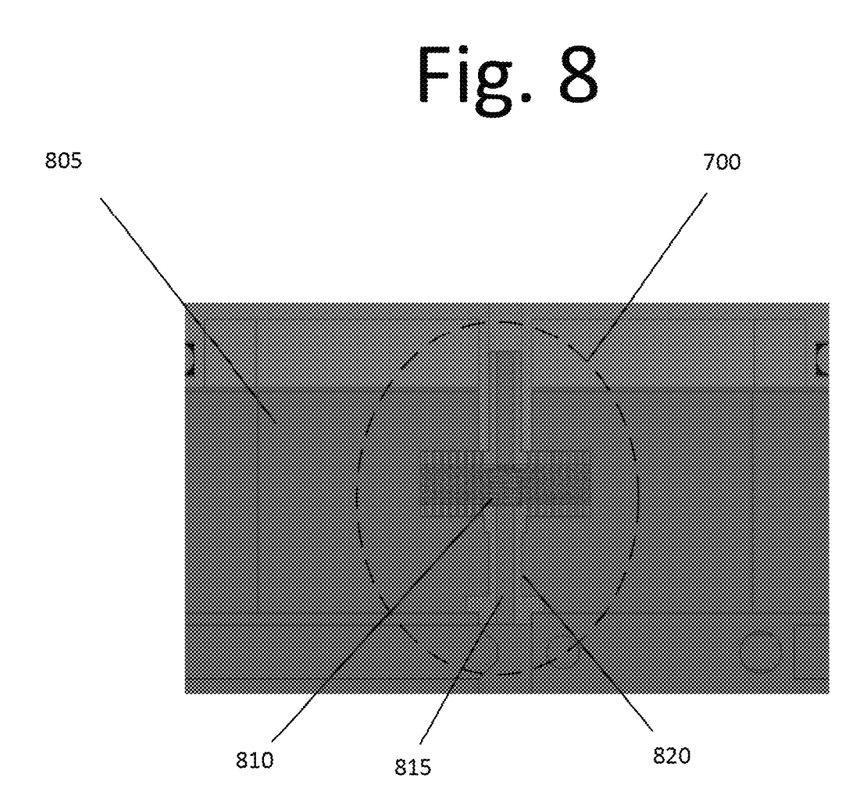
FIG. 8 is a diagram illustrating a cross-section of PMD of FIG. 7 within a tank, according to an embodiment of the present invention.

FIG. 8 is a diagram illustrating a cross-section of PMD 700 of FIG. 7 within a tank 805, according to an embodiment of the present invention. In this embodiment, path 815 shows how the gas and/or vapor travel through small holes 810 into central flow shaft 820.

In practice, when tank 805 is filled with liquid propellant up to 50 percent capacity (e.g., 20 mL for the example embodiment in FIG. 3), at least half of holes 810 are exposed to propellant vapor and/or decomposition byproduct gas, even under the influence of gravity in any vehicle orientation. With microgravity or a lower fill fraction, additional holes 810 may be exposed as the liquid propellant, which seeks the side wall and corners of tank 805 in microgravity. Due to cohesion and hydrophobicity, only propellant vapor or gas passes through PMD 700 and into central flow shaft 820.

This was verified in development testing of the embodiment of the invention shown in FIG. 3. It should be noted that the PMD and tank, as part of a full propulsion system (including TM and GVM), were violently shook on a table used for simulation of launch loads. They were then placed in an oven used for simulation of orbital temperature fluctuations. This simulated the intense launch and orbital environments that the propulsion system would experience getting to and operating in low earth orbit (LEO). These are the environments that could result in liquid being forced in the manifolds and cause (1) a thruster failure and/or (2) an over-pressurization event if the vapor propulsion management system is not functional.

Figure 9:
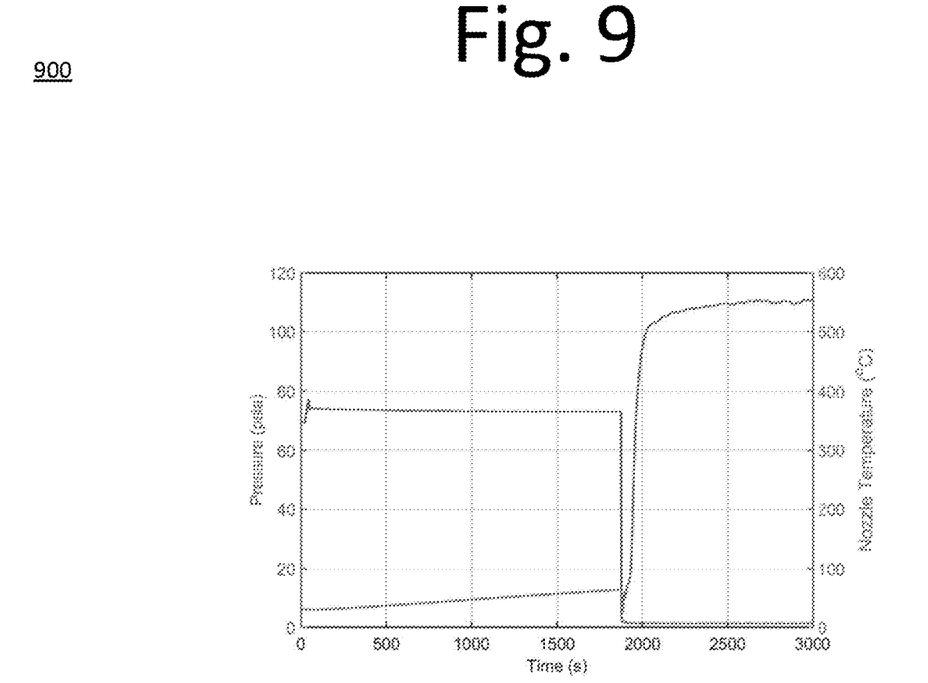
FIG. 9 is a graph illustrating the vacuum hot fire test for an embodiment of the propulsion system after the environmental testing, according to an embodiment of the present invention.

FIG. 9 is a graph 900 illustrating the vacuum hot fire test for an embodiment of the propulsion system after the environmental testing described above, according to an embodiment of the present invention. In graph 900, at 46 seconds, the data shows the VRVs venting as they reach the set pressure of approximately 75 psi. At 1876 seconds, the valves in the TM are opened allowing gas and propellant vapor to travel to the reacting surface and out the nozzle into vacuum. The immediate rise in catalyst temperature within the data and the lack of liquid spray out of the nozzle (verified via viewport on vacuum chamber), indicate no liquid traversed the junction and entered the TM. If liquid were present in the TM, a visible spray would be evident in the viewport and the catalyst temperature data profile would be erratic. This was witnessed in a prior test without the invention.

As shown in FIG. 2, the bottom of flow shaft leads to the TM. See, for example, FIG. 10, which is a diagram illustrating a propellant vapor flow manifold or TM 1000, according to an embodiment of the present invention. The top of flow shaft however leads to an over-pressurization manifold or GVM. See, for example, FIG. 11, which is a diagram illustrating an over-pressurization manifold or GVM 1100, according to an embodiment of the present invention.

Figure 10:
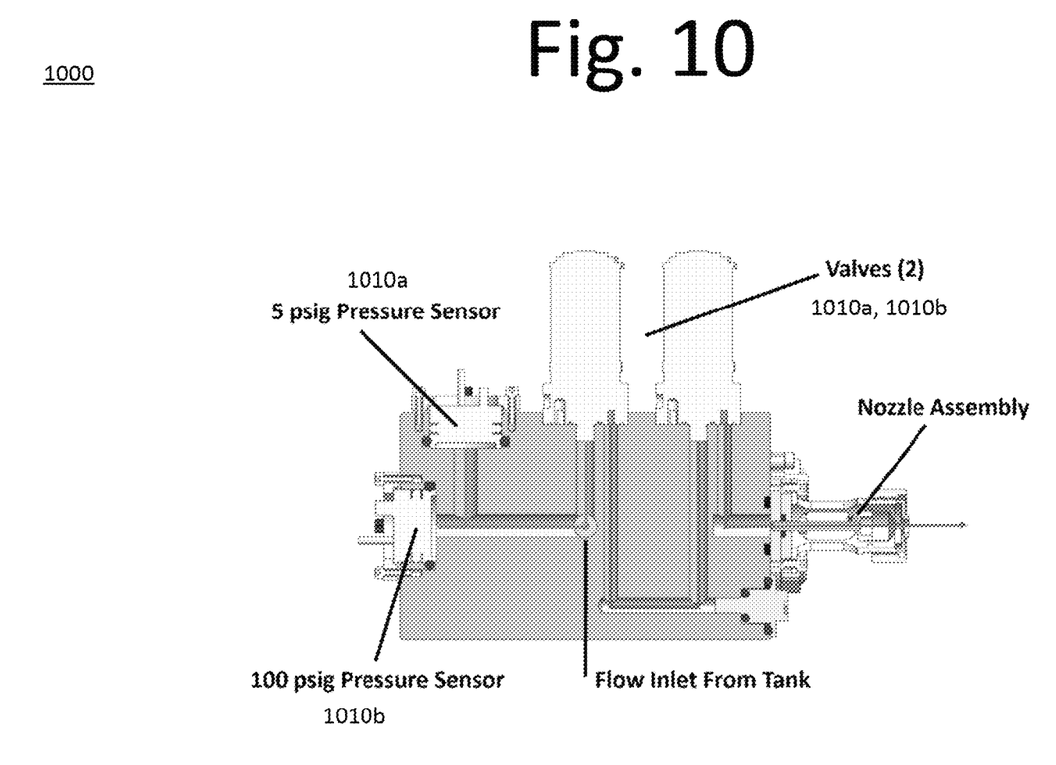
FIG. 10, which is a diagram illustrating a propellant vapor flow manifold or TM, according to an embodiment of the present invention.

FIG. 10 is a diagram illustrating a TM 1000, according to an embodiment of the present invention. The liquid propellant vapor and/or gas flows from the center inlet through two valves 1005a, 1005b and onto the thruster to produce thrust. In this embodiment, two pressure sensors 1010a, 1010b are placed ahead of the valves 1005a, 1005b to take measurements of tank and PMD pressure.

Figure 11:
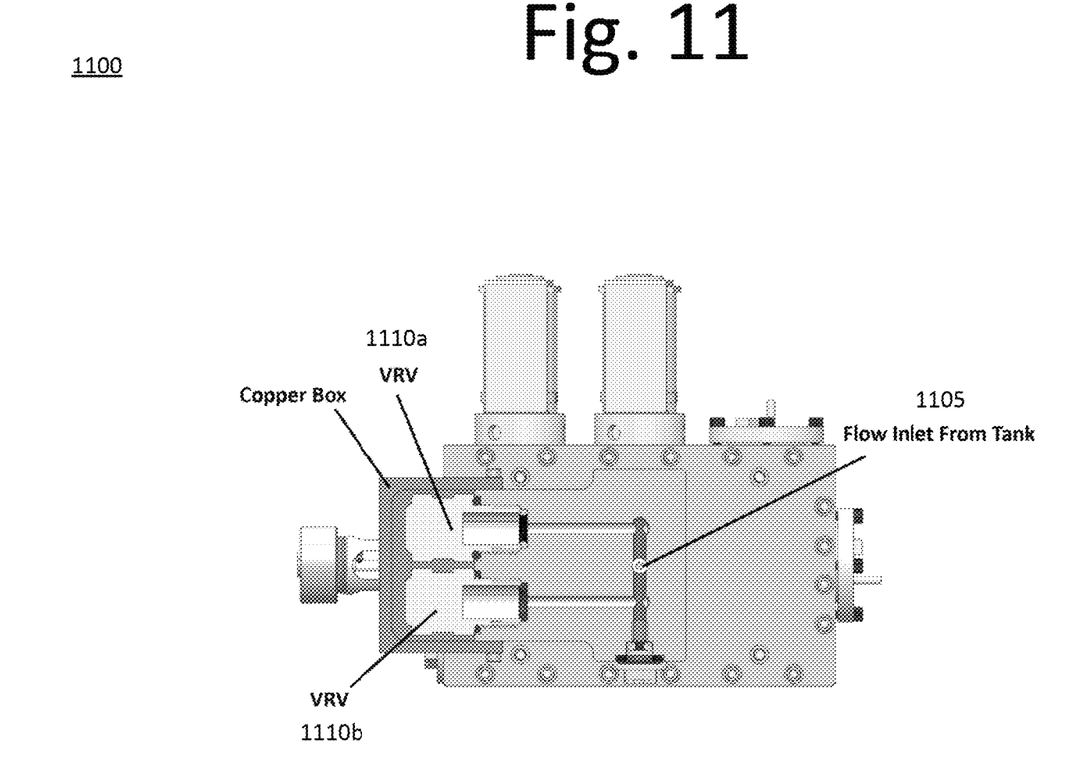
FIG. 11 is a diagram illustrating a GVM, according to an embodiment of the present invention.

FIG. 11 is a diagram illustrating an GVM 1100, according to an embodiment of the present invention. The gas and/or vapor flows from central inlet 1005 to two parallel vent relief valves 1010a, 1010b set to a crack pressure of 75 psi. If the VRVs read a pressure of 75 psi or greater, VRVs 1010a, 1010b open allowing the gas and/or vapor to vent. Once the pressure is less than 75 psi, VRVs 1010a, 1010b reseat. In this embodiment, VRVs 1010a, 1010b automatically actuate when the set pressure is reached, allowing for over-pressurization protection without human interaction. In this embodiment, a perforated copper box surrounds the VRV as a secondary protection against liquid hydrogen peroxide leaving the system. Any trace peroxide would be trapped and decompose into water and oxygen.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A propellant management system, comprising:
a propellant management device (PMD) configured to reduce or prevent liquid propellant from entering a thruster manifold or gas venting manifold while allowing propellant vapor and/or gas to pass through the PMD to allow for thrust or venting, wherein
the PMD comprises a junction on the inside of the tank, the junction being constructed with hydrophobic material, and the junction connecting entry ports of the thruster manifold and the gas venting manifold.

2. The propellant management system of claim 1, further comprising:
a tank in which the PMD is situated therein, and
the hydrophobic material creates low interfacial tension between the junction and the liquid, repelling the liquid from the surface of the junction.

3. The propellant management system of claim 2, wherein the junction comprises a plurality of holes of a predefined diameter configured to allow the propellant vapor and/or gas to pass to the thruster manifold and/or the gas venting manifold by way of a shaft.

4. The propellant management system of claim 3, wherein the junction is located in the center of the tank, leaving one or more of the plurality of holes exposed to a gas phase and/or vapor phase.

5. The propellant management system of claim 3, wherein the shaft is part of the PMD and comprises a central tube connecting to a thruster manifold and the gas venting manifold, and
each of the plurality of holes are connected to the central tube, allowing the propellant vapor and/or gas to travel down through the shaft and into either the thruster manifold or the gas venting manifold.

6. The propellant management system of claim 5, wherein the gas venting manifold facilitates the flow of the propellant vapor and/or gas from the junction and the shaft and out of one or more venting relief valves when a designated pressure is reached, all while keeping the liquid propellant inside of the tank.

7. A propellant management system, comprising:
a pressure management device (PMD) placed inside of a tank, wherein the PMD is configured to reduce or prevent liquid propellant from entering a thruster manifold or gas venting manifold while allowing propellant vapor and/or gas to pass through the PMD to allow for thrust or venting; and
a shaft connecting the PMD to a thruster manifold and a gas venting manifold, wherein the shaft is configured to allow the propellant vapor and/or gas to pass through to the thruster manifold or the gas venting manifold.

8. The propellant management system of claim 7, wherein the PMD comprises a junction partially exposed to liquid inside of the tank, wherein the junction is configured to prevent liquid propellant from entering the shaft.

9. The propellant management system of claim 8, wherein the junction is constructed with hydrophobic material, creating low interfacial tension between the junction and the liquid, repelling the liquid from the surface of the junction.

10. The propellant management system of claim 8, wherein the junction comprises a plurality of holes, some of which are exposed or partially exposed to liquid inside of the tank, wherein
the plurality of holes configured to prevent the liquid from entering the shaft.

11. The propellant management system of claim 7, wherein the PMD comprises a plurality of holes allowing for excess pressure to be vented through the gas venting manifold.

12. The propellant management system of claim 7, wherein the PMD comprises multiple parts which are press fit together prior to being placed inside of the tank.

13. The propellant management system of claim 7, wherein the gas venting manifold facilitates the flow of the propellant vapor and/or gas from the junction and the shaft and out of one or more venting relief valves when a designated pressure is reached, all while keeping the liquid propellant inside of the tank.

14. A propellant management system, comprising:
a propellant management device (PMD) configured to reduce or prevent liquid propellant from entering a thruster manifold or gas venting manifold while allowing propellant vapor and/or gas to pass through the PMD to allow for thrust or venting, wherein
the PMD comprises a junction on the inside of a tank, the junction being constructed with hydrophobic material, the hydrophobic material configured to create low interfacial tension between the junction and the liquid propellent, repelling the liquid propellant from the surface of the junction, and the junction connecting entry ports of the thruster manifold and the gas venting manifold.

15. The propellant management system of claim 14, wherein the junction comprises a plurality of holes of a predefined diameter configured to allow the propellant vapor and/or gas pass to the thruster manifold and/or the gas venting manifold by way of a shaft.

16. The propellant management system of claim 15, wherein the junction is located in center of the tank, leaving one or more of the plurality of the holes exposed to a gas phase and/or vapor phase.

17. The propellant management system of claim 15, wherein the shaft is part of the PMD and comprises a central tube connecting a thruster manifold and the gas venting manifold, and
   each of the plurality of holes are connected to the central tube, allowing the propellant vapor and/or gas to travel down through the shaft and into either the thruster manifold or the gas venting manifold.

18. The propellant management system of claim 17, wherein the gas venting manifold facilitates the flow of the propellant vapor and/or gas from the junction and the shaft and out of one or more venting relief valves when a designated pressure is reached, all while keeping the liquid propellant inside of the tank.

\* \* \* \* \*